UNITED STATES PATENT OFFICE.

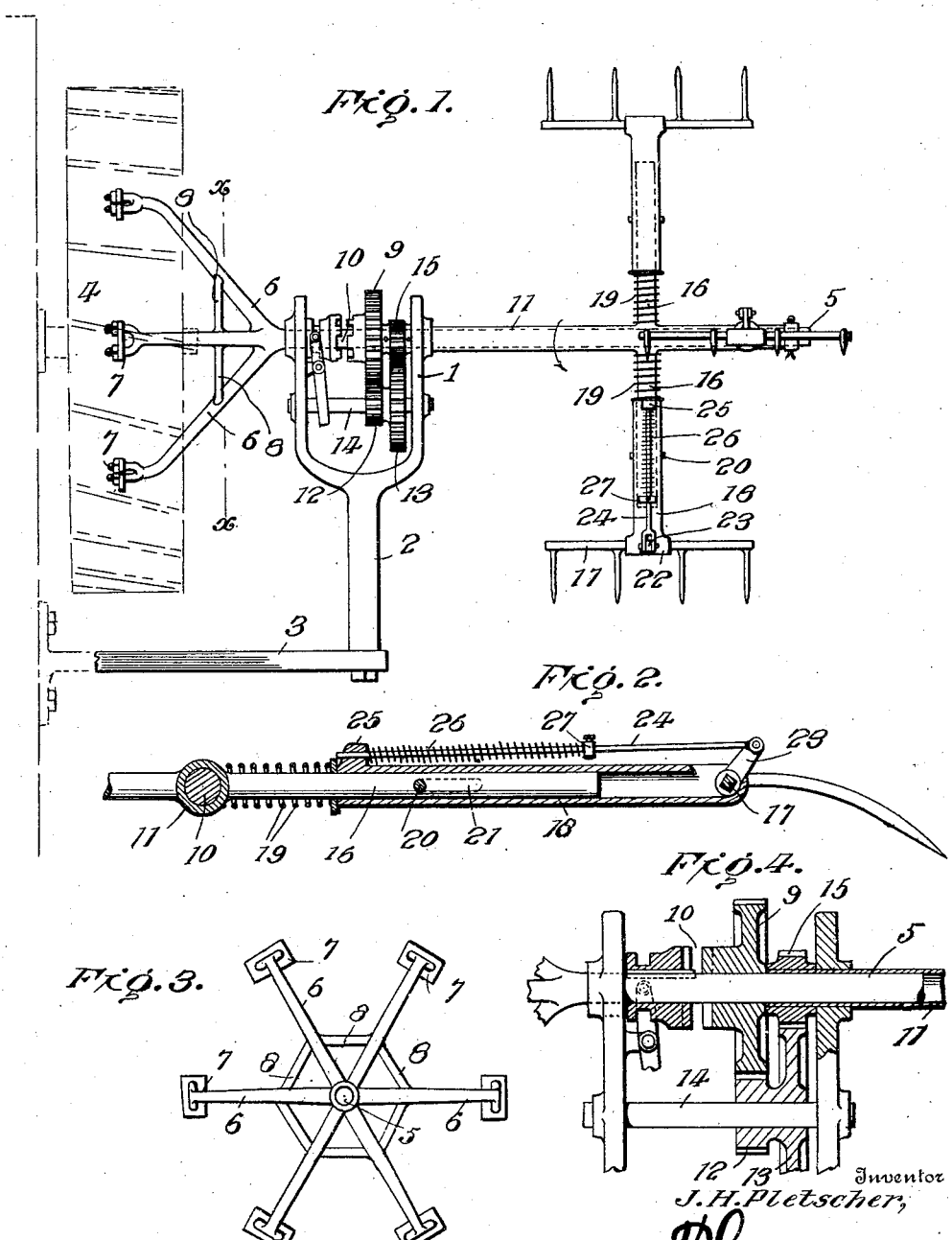

JOHN H. PLETSCHER, OF DEER CREEK, OKLAHOMA.

TEDDER ATTACHMENT.

No. 880,094.   Specification of Letters Patent.   Patented Feb. 25, 1908.

Application filed March 11, 1907. Serial No. 361,856.

*To all whom it may concern:*

Be it known that I, JOHN H. PLETSCHER, citizen of the United States, residing at Deer Creek, in the county of Grant, Oklahoma, have invented certain new and useful Improvements in Tedder Attachments, of which the following is a specification.

This invention provides an attachment of novel form for loosening and lightening grain after the same has been mown to insure rapid curing thereof and prevent mold or other deterioration resulting from having the same pressed close to the ground either by the mowing machine or the team.

The device is of such structure as to admit of its ready attachment to any make, style or type of mowing machine and which in operation will insure a thorough tossing of the grain and lightening of the same so that air may freely circulate about the same which is essential in the curing process.

For a full description of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a detail view in elevation of the attachment applied to a mower. Fig. 2 is a central longitudinal section of the stem of a fork or rake showing the relation of the adjunctive or coöperating parts. Fig. 3 is a sectional view of the shaft attaching means on the line x—x of Fig. 1 looking to the left. Fig. 4 is a detail view of a portion of the frame and gearing showing the parts on a larger scale.

Corresponding and like parts are referred to in the following description and indicated in all the views of the drawings by the same reference characters.

The attachment comprises a frame, the same consisting of a fork 1 and a stem 2, the latter being connected to the frame of the mower by means of a bar 3 and the fork being supported from the drive wheel 4 of the mower by means of a shaft 5 which is clipped to the spokes of said drive wheel. A series of arms 6 radiate from the shaft 5 and terminate in clips 7 which are attached to the spokes of the drive wheel. Braces 8 connect the arms 6 with the end of the shaft 5 so as to form a substantial structure. A gear wheel 9 is loose upon the shaft 5 and is adapted to be thrown into and out of engagement therewith by means of a suitable clutch 10. The shaft 5 is loosely mounted in the members of the fork 1 and supports a hollow shaft 11 which carries the forks by means of which the grain, when mown, is tossed and lightened. The gear wheel 9 is in mesh with a pinion 12 and the latter has formed therewith, or connected thereto, a gear wheel 13 so as to rotate therewith, the pinion 12 and gear wheel 13 being mounted upon a shaft 14 paralleling the shaft 5. The gear wheel 13 is in mesh with a pinion 15 fast to the inner end of the hollow shaft 11.

A series of arms 16 radiate from the outer portion of the hollow shaft 11 and each supports a fork or rake 17 whose stem 18 is hollow and telescopes with its supporting arm 16, a spring 19 normally exerting a pressure outward upon the hollow stem 18 to admit of the fork or rake yielding when meeting with an obstruction such as a stone, root or the like. A pin 20 projected laterally from each arm 16 enters a slot 21 of the stem 18 to limit the movements of the latter and to prevent outward displacement of the fork or rake under the action of the spring 19. The arms 16 have a staggered arrangement, thereby enabling the forks or rakes to cover a wider track than would be possible if the arms were set in the same plane without making the heads of the forks or rakes of extra length.

It is of advantage to have the teeth yield so as to avoid bending or breaking the same when subjected to severe or abnormal strain and for this purpose, the head of the fork or rake is mounted in a sleeve 22 at the outer end of the stem 18 and an arm 23 connected with the head of the fork or rake so as to turn therewith has a rod 24 attached thereto and adapted to play through a lug 25 near the inner end of the stem 18, a coiled spring 26 being mounted upon the rod 24 and confined between the lug 25 and a stop 27 near the outer end of the rod 24 so as normally to hold the fork or rake in working position. The sleeve 22 is split and in the space formed between the separated parts is located the arm 23, the latter having an angular opening to receive a corresponding angular portion of the head of the fork or rake, thereby causing the two to turn together. When the fork or rake turns under abnormal or excessive strain, the spring 26 is subjected to tension and when the obstruction is cleared, the fork or rake assumes a normal position by the action of the spring 26 in regaining itself.

It will be observed that the shafts 5 and 11 are concentric and in line with the axle of the mower. As the mowing machine is advanced over the field, motion is imparted to the shaft 5 and is transmitted therefrom to the shaft 11 through the intermediate gearing, the speed of the shaft 11 being greater than that of the shaft 5, thereby insuring a thorough tossing or lightening of the grain. Each fork or rake has a two-fold movement to adapt it to the surface of the ground over which the mower is propelled, one motion being that of the stem 18 upon the arm 16 and the other consisting of the turning of the head of the fork or rake in the sleeve 22.

Having thus described the invention, what is claimed as new is:

1. A tedder attachment for agricultural implements, the same comprising a shaft, means for connecting said shaft with the drive wheel of the implement to support said shaft therefrom and impart movement thereto, and arms projected outward from the shaft and provided with forks.

2. A tedder attachment for agricultural implements, the same comprising a shaft provided with means for connecting it to a drive or supporting wheel of the implement, arms loosely mounted upon the said shaft and projected outward therefrom and provided with forks, a speed gear between the said arms and the shaft, whereby the forks are rotated at a higher speed than the drive wheel to which the attachment is secured and from which it derives motion.

3. A tedder attachment comprising a shaft, means for connecting said shaft to a drive wheel for imparting movement to the shaft and supporting the same from the drive wheel, a second shaft mounted upon the first mentioned shaft and provided with outwardly extended arms bearing forks, and a variable speed gearing between the two shafts, whereby the shaft provided with the forks in adapted to rotate at a higher speed than the shaft supported from and attached to the drive wheel.

4. In a tedder attachment, the combination of a frame, a shaft mounted in said frame and adapted to be connected with the drive wheel of a mower or like machine, a rotary fork or rake mounted concentric with said shaft, gearing between the rotary fork and shaft including the clutch to admit of throwing the fork into and out of operation, and means for preventing rotation of the frame in which the aforementioned shaft is mounted.

5. A tedder attachment comprising a frame, a shaft mounted in the frame, arms radiating from said shaft and provided in their ends with clips, braces between said arms and shaft, a second shaft concentric with the first mentioned shaft, a train of gearing between the two shafts including a clutch, and forks or rakes connected with said second shaft to rotate therewith.

In testimony whereof I affix my signature in presence of two witnesses.

JOHN H. PLETSCHER. [L. S.]

Witnesses:
  C. F. EBERLE,
  F. W. ROBERTS.